Sept. 13, 1960 G. PARENTI 2,952,186
ENLARGEMENT CHANGER FOR BINOCULAR VIEWING SYSTEMS
Filed March 9, 1959

INVENTOR.
Gino Parenti

United States Patent Office

2,952,186
Patented Sept. 13, 1960

2,952,186
ENLARGEMENT CHANGER FOR BINOCULAR VIEWING SYSTEMS

Gino Parenti, Rome, Italy, assignor to Ottico Meccanica Italiana E Rilevamenti Aerofotogrammetrici-O.M.I.-Soc. p. Az., Rome, Italy Filed Mar. 9, 1959, Ser. No. 798,227

Claims priority, application Italy Mar. 20, 1958

2 Claims. (Cl. 88—29)

The binocular stereoscopic viewing systems designed for the measurement of parallaxes on aerial stereographs may be used with photographs taken on parallel or convergent axes, depending on the plotting technique used.

One substantial difference between the two systems lies in the fact that in the former case the homologous images of the same object on the two photographs are of the same apparent dimensions. This is due to the fact that the ratios of conjugated distances, internal and external, remain constant. In other words, since the plane of the photograph is parallel to the plane of the terrain photographed, the image of the latter is similar to the terrain itself.

In the case of convergent photographs, since the plane of the photograph is not parallel to the terrain, the image of the latter is not similar, but will be enlarged in the points on side (b) of the plate and smaller in the points on side (a), because the ratios between the internal and external coordinate change continuously. It evidently ensues that the two images of each of the objects which are not located at the same distance from the photograph points will appear on the plate in different sizes. Although stereoscopic sighting is not, in line of principle, obtained from this circumstance, it was noted that when the ratio between the size of the two images exceeds a certain limit, sighting alterations are experienced which may result in a less accurate sighting.

The object of this invention is to introduce a change in enlargement in the two optical paths of view, so as to increase or reduce the images that appear respectively smaller and larger, so as to make them appear to the viewer to be approximately of the same size.

However, since the instrument may also be used with convergent photographs, the device, through an appropriate adjustment, makes it possible to change the enlargement simultaneously in the two systems and in the same sense, and also to adjust the two sighting systems separately of each other.

The foregoing and ancillary objects are attained by this invention, the preferred embodiment of which is set forth in the following description and illustrated in the accompanying drawing, wherein.

Figure 1:
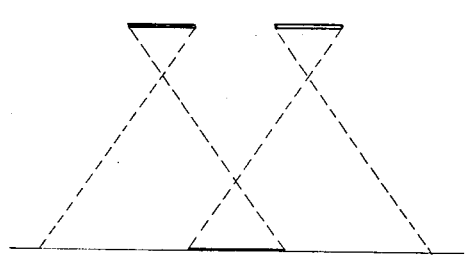
Fig. 1 is a diagrammatic view showing how the ratios between the conjugate inner and outer distances of the stereoscopic photographs taken with parallel axes remain constant when the said photographs are taken with convergent axes.
Figure 2:
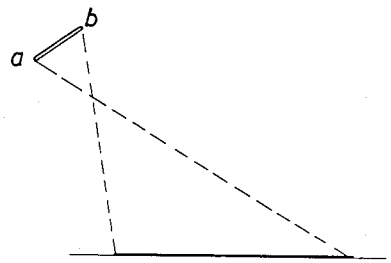
Fig. 2 is a diagrammatic view showing how the same ratios present images that are not similar to one another, and, Fig. 3 is a perspective view of one form of the enlargement system in accordance with the invention.
Figure 3:
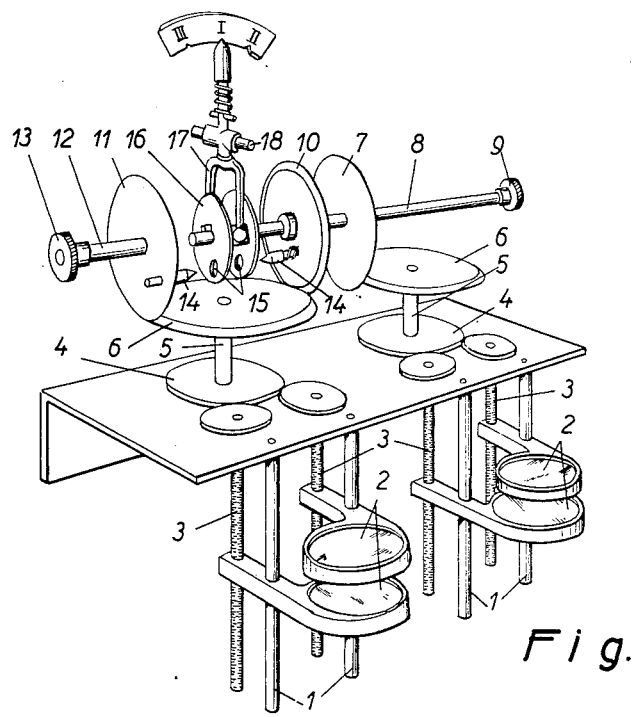

The embodiment of the invention is illustrated in diagrammatic form in Fig. 3. Each enlargement changer consists of two lenses moving along their axis by different spaces, so as to maintain the image on the focal plane as the power of the systems changes.

The lens holders, which are guided by bushings fitting slidably over guides 1, are fitted with coarse-pitch lead screws 3, which cause the lenses 2 to move longitudinally. Each screw has different pitch, so that it is possible to obtain the movements required to achieve the change in focal distance of the systems. Each screw 3 is fitted at the end with a gear, and both gears, relating to each panfocal system, are actuated by a single gear 4. The latter is fastened to shaft 5, which carries a taper gear 6.

These taper gears are actuated in a different manner, and specifically as follows: one of them, for instance that of the optics of the right eye, meshes with another taper gear 7 fastened to the shaft 8 which carries the control knob 9 on the right side of the viewing system. Taper gear 6, pertaining to the left-eye viewing system, meshes with two coaxial taper gears, one of which, 10, idly mounted on shaft 8, and the other, 11, fastened to shaft 12 carrying the adjustment knob 13.

Each of the two taper gears, 10 and 11, is fitted with a spring-loaded plunger 14 which, in its normal position, coincides with holes 15 as shown in the figure. Between gears 10 and 11, mounted slidably but not rotatably on shaft 8, is spool 16, fitted with two opposite recesses, each capable of receiving plungers 14.

By means of yoke 17, pivoted at 18, spool 16 may be placed in either of three different positions, as desired by the operator, as described below:

(1) Central position, in which neither of the two plungers 14 is engaged; shaft 8, rotated by the right-hand knob, does not actuate gears 10 and 11 but only gear 7, and therefore the right-hand changer. The left-hand knob, connected to gear 11, instead, actuates independently the left-hand changer. Therefore, in this case, each of the two changers is controlled independently by its own knob.

(2) With the spool moved to the left, so that plunger 14 on gear 11 is engaged, shaft 8 becomes fixed to shaft 12, so that the rotation of the two control knobs, and consequently of changer screws 3, become interlinked; by actuating either knob, both enlargements are changed at the same time, so that images increase or decrease in size in a uniform manner.

(3) In the third position, with the spool engaging plunger 14 on gear 10, the rotations of shafts 8 and 12 and of the control knobs and enlargement changer screws take place in opposite directions, and therefore while one image increases in size the other decreases proportionally. Moreover, the gear ratio and screw pitches are calculated in such a way that to the full travel of the enlargement changer there corresponds less than one revolution of gears 10 and 11, and therefore also of shafts 8 and 12. Due to this fact, the movements of the changers can go always back to the right phase regardless of the position in which yoke 17 was actuated. In effect, if, starting from the idle position, yoke 17 is moved to shift to the right or to the left the spool 16, even if the recess in the latter does not match the plunger, the latter will be depressed, and as either knob is rotated, it will eventually drop into the recess, this being possible only in one way, since the shaft, and therefore the spool, rotates by less than one revolution.

What I claim is:

1. An enlargement changer for a binocular optical system, comprising: a right-hand and a left-hand optical system, consisting of two lenses, each mounted slidably along guides, actuated by lead screws and threaded holes in the lens holders, one of the screws of each system being of a pitch different from the other; a gear for each pair of screws, with which mesh the two gears fastened at the ends of the screws of each optical system; a shaft on which is keyed the said gear driving each pair of screws; a first taper gear for each of the said systems, keyed at the end of the shaft on which is keyed also the gear that drives the pairs of screws; control organs for the right-hand optical system consisting of a second taper gear meshing with the first right-hand taper gear and keyed to a shaft at the end of which a control knob is fastened, on which shaft is mounted and free to revolve a third taper gear meshing with the first left-hand taper gear; a fourth taper gear meshing with the said first left-hand taper gear and mounted on a second shaft coaxial with the first, and fitted at the end with a control knob; spring-loaded plungers mounted on the said third and fourth taper gears, having their axes parallel to the axis of the said gears; a spool coaxial with the shaft on which are mounted the second and third taper gears and mounted slidably but not rotatably thereon, such spool being slidably mounted to assume three positions: a first position in which both spring-loaded plungers are free to rotate; a second position in which the spring-loaded plunger of the fourth taper gear is locked being engaged into a hole in the said spool and a third position in which the third taper gear is locked because its plunger is engaged in another hole in the said spool.

2. An enlargement changer, as claimed in claim 1, in which the kinematic ratios between the control organs and those that move the lenses along their guides are such that to the full travel of the changer elements there corresponds less than one revolution of the control knobs and of the movement distribution device, so that regardless of the position in which the enlargement change is effected, the control organs always fall back into the same position which permits the full travel of the optical systems.

No references cited.